United States Patent
Pelletier et al.

(10) Patent No.: US 7,359,372 B2
(45) Date of Patent: Apr. 15, 2008

(54) METHOD AND APPARATUS FOR FAST CHANGE OF INTERNET PROTOCOL HEADERS COMPRESSION MECHANISM

(75) Inventors: Ghyslain Pelletier, Lulea (SE); Lila Madour, Kirkland (CA)

(73) Assignee: Telefonaktibolaget LM Ericsson (Publ), Stockholm (SE)

( * ) Notice: Subject to any disclaimer, the term of this patent is extended or adjusted under 35 U.S.C. 154(b) by 867 days.

(21) Appl. No.: 10/458,326

(22) Filed: Jun. 11, 2003

(65) Prior Publication Data

US 2004/0042507 A1 Mar. 4, 2004

Related U.S. Application Data

(60) Provisional application No. 60/387,609, filed on Jun. 12, 2002.

(51) Int. Cl.
*H04L 12/66* (2006.01)
(52) U.S. Cl. ...................................... 370/352
(58) Field of Classification Search ............ None
See application file for complete search history.

(56) References Cited

U.S. PATENT DOCUMENTS 6,300,887 B1 * 10/2001 Le ............................. 341/60
2004/0034708 A1 * 2/2004 Pelletier et al. ............. 709/227

FOREIGN PATENT DOCUMENTS

| WO | WO 01/31881 | 5/2001 |
|---|---|---|
| WO | WO 01/35598 | 5/2001 |
| WO | WO 01/65804 | 9/2001 |
| WO | WO 02/11397 | 2/2002 |
| WO | WO 02/11397 A1 * | 2/2002 |

OTHER PUBLICATIONS

M. Degermark et al., IP Header Compression, Network Working Group, RFC 2507, Feb. 1999.
V. Jacobson, Compressing TCP/IP Headers for Low-Speed Serial Links, Network Working Group, RFC 1144, Feb. 1990.
S. Casner et al., Compressing IP/UDP/RTP Headers for Low-Speed Serial Links, Network Working Group, RFC 2508, Feb. 1999.
C. Bormann et al., Robust Header Compression (ROHC): Framework and four profiles: RTP, UDP, ESP, and uncompressed, Network Working Group, RFC 3095, Jul. 2001.
L.E. Jonsson et al., Robust Header Compression (ROHC): A Link-Layer Assisted Profile for IP/UDP/RTP, Network Working Group, RFC 3242, Apr. 2002.

* cited by examiner

*Primary Examiner*—Ramnandan Singh
(74) *Attorney, Agent, or Firm*—Alex Nicolaescu, Ericsson Canada Inc.

(57) ABSTRACT

A method and a decompressor node in Internet Protocol (IP) network for fast change of IP Headers Compression (HC) mechanism are provided. A Mobile Station (MS) connected to a serving system uses a first IP HC mechanism therewith. Upon initiating handoff of the MS from the serving system to a target system, a second IP HC mechanism is chosen to be used with the target system. The second IP HC mechanism is initialized using information received at the target system from the serving system. In a preferred embodiment, the received information is a decompression context and the initialization of the second IP HC mechanism consists of translating the decompression context from the first IP HC mechanism to the second IP HC mechanism.

7 Claims, 5 Drawing Sheets

METHOD AND APPARATUS FOR FAST CHANGE OF INTERNET PROTOCOL HEADERS COMPRESSION MECHANISM

PRIORITY STATEMENT UNDER 35 U.S.C S.119 (E) & 37 C.F.R. S.1.78

This non-provisional patent application claims priority based upon the prior U.S provisional patent application entitled "A method for IP Header compression", application No. 60/387,609, filed Jun. 12$^{th}$, 2002, in the names of Lila MADOUR and Ghyslain PELLETIER.

BACKGROUND OF THE INVENTION

1. Field of the invention

The present invention relates to fast change of Internet Protocol Headers Compression algorithm.

2. Description of the Related Art

Due to the tremendous success of the Internet, it has become a challenging task to make use of the Internet Protocols (IP) over all kinds of network links. IP usually refer to numerous packet switching protocols such as IPv4 (Internet protocol version 4), IPv6 (Internet protocol version 6), UDP (User Datagram Protocol), UDP-Lite, TCP (Transport Control Protocol), RTP (Real-time Protocol), etc. An IP packet is usually composed of a payload of information sequentially encapsulated in one or more IP protocols. Reference is now made to the Drawings wherein FIG. 1 shows an exemplary IP packet 100 formed by a payload 110, a RTP header 140, a UDP header 130 and an IPv4 header 120. The IP packet 100 is referred to as an IPv4/UDP/RTP packet. For simplicity purposes, the headers 120, 130 and 140 are usually jointly referred to as IP headers 150. It should be understood that other sets and subsets of IP protocols each having different header configurations can be used to form the IP packet 100 and the IP headers 150. Each header 120, 130 and 140 of the IP headers 150 carries specific information about the IP packet 100, which information is used by the destination of the packet 100 to interpret the payload 110. The carried information in the IP headers may include origination and destination of the IP packet 100, associated quality of service information, a sequence number, checksum information for integrity of the payload, etc. One drawback of IP is the large size of the IP headers. It is not a simple task to make use of IP over narrow band network links as, for example, cellular links. As an example, using the IP protocols for ordinary speech data (e.g. Voice-over-IP or VoIP using IPv4/UPD/RTP or IPv6/UPD/RTP) may represent a loss of as much as 70% of the bandwidth capacity of a given network link.

The term header compression (HC) comprises the art of minimizing the necessary bandwidth used by the IP headers. It is usually performed on a per-hop basis over point-to-point network links. Header compression techniques, in general, have a more than ten-year-old history within the Internet community. Several techniques commonly used are described in the following documents: RFC 1144 [VJ], RFC 2507 [IPHC] and RFC 2508 [CRTP], all herein included by reference. Header compression takes advantage of the fact that some fields in the IP headers are not changing (static) within a stream of packet pertaining to a given packet flow, or change with small or predictable values. Header compression techniques make use of these characteristics and send static information only initially, while changing fields are sent with their absolute values or as differences from packet to packet. Completely random information has to be sent without any compression at all. The challenging task of any header compression technique is to keep both ends of the network link consistent with each other. For that purpose, a compressor at one end and a decompressor at the other end each make use of a compression context. The use of the compression contexts aims at keeping the IP headers size as low as possible. To do so, each end manages all necessary information to eliminate some fields (totally or partially) from the IP headers at the compressor end and to rebuild the IP headers at the decompressor end.

Header compression techniques are thus an important component to make VoIP over Wireless (VoIPoW) an economically feasible alternative to circuit switched voice. For this purpose, some header compression techniques have been developed by the Robust Header compression (ROHC) Working Group of the Internet Engineering Task Force (IETF). RFC 3095 [ROHC] and RFC 3242 ROHC LLA [LLA] herein included by reference, describes an extensible framework for which profiles for compression of various networking protocols may be defined. The following example takes the header compression technique defined in ROHC as an example. In such a case, the compression contexts of both the compressor and the decompressor contain and maintain relevant information about past packets, which information is used to compress and decompress subsequent packets. More precisely, ROHC says the following: "The context of the compressor is the state it uses to compress a header. The context of the decompressor is the state it uses to decompress a header. Either of these or the two in combination are usually referred to as "context", when it is clear which is intended. The context contains relevant information from previous headers in the packet stream, such as static fields and possible reference values for compression and decompression. Moreover, additional information describing the packet stream [or flow] is also part of the context, for example information about how the IP Identifier field changes and the typical inter-packet increase in sequence numbers or timestamps."

In order to work properly, each header compression technique requires an initialization phase during which the compressor and the decompressor build their respective compression context. This phase is usually referred to as the context initialization phase. It usually requires the compressor to start using a low compression state. Initially, the transmitted packets contain the information necessary to initialize at least the static and maybe the dynamic part of the decompressor context. The compressor must then have enough confidence that the decompressor has the proper context before a transition to a higher compression ratio takes place. This confidence may be achieved using explicit feedback from the decompressor to the compressor, or by sending a number of context initialization packets repeatedly for a large enough interval. The use of explicit feedback requires at least one Round-Trip Time (RTT) period before confidence may be achieved. The use of a predetermined number of packets may achieve confidence in less than one RTT period but cannot absolutely guarantee that the decompressor does have the proper context other than optimistically expect to be successful with a high percentage rate. The maximum compression ratio achievable on a given link largely depends on the header compression technique used thereon. However, it takes several phases of confidence/transition before reaching the maximum compression ratio of a given compression technique.

Reference is now made concurrently to FIG. 2 and FIG. 3, which respectively show an exemplary prior art architecture of a header compression technique between a Mobile Station (MS) 210 and a Base Station (BS) 220 in a wireless system 200 and a prior art exemplary architecture of a header compression technique between the MS 210 and a Packet Data Serving Node (PDSN) 230 in the wireless system 200. In wireless standards for packet data communications, multiple header compression (HC) techniques may be supported and may be used to compress similar packet flows. For example, IP/UDP/RTP packets may be compressed using Compressed Real-time Transport Protocol (CRTP), but in particular using either the ROHC RTP [ROHC] profile or the ROHC LLA (Link-Layer Assisted) profile [LLA]. The Mobile Station (MS) 210 may thus support one or many of these header compression techniques and request from a Radio Access Network (RAN) (represented by the BS 220 and a Packet Control Function 240) or from a Core Network (CN) (represented by the PDSN 230) the use of any of the supported header compression techniques. In general, the network side may provide support for different header compression techniques for different packet data services but does not necessarily support all types of services.

The wireless system 200 is, in general, composed of a number of nodes including the MS 210, the Base Station 220, the PCF 240 and the PDSN 230 or their equivalent in accordance with which wireless standard the wireless system 200 is built. The BS 210 may be connected to the PCF 240, which in turn may be connected to the PDSN 230. A Header Compression functionality (HC) may be located in different nodes depending on the wireless system's 200 architecture. FIG. 2 shows the example of a generic architecture for the wireless system 200 where HC is located in the MS 210 and in the BS 220. Another example is shown in FIG. 3, where the HC is located in the MS 210 and in the PDSN 230. In some cases, additional functionality supporting HC may be found in other nodes such as in the BS 220 as pictured in FIG. 2 and FIG. 3, which is represented by an Assisting Layer 250.

The wireless system 200 is built to provide the possibility for the MS 210 to freely move from a coverage area (not shown) to another while maintaining connectivity to a particular packet data service. One or multiple base stations similar to the BS 220 serve each coverage area. When the MS 210 is connected to the RAN and to a number of services (not shown), the nodes and services involved in the communication are referred to as a serving system (220-240). In the examples of FIG. 2 and FIG. 3, the serving system is composed of the BS 220, the PCF 240 and the PDSN 230. When moving from the serving system to a second system, the second system allocating resources and taking over the communication is referred to as a target system (not shown).

The various packet data services offered by the RAN may be defined using different Service Options (SO), each based on traffic characteristics (real-time, streaming, best effort, etc.) and traffic requirements (delays, error rates, etc.). A given SO may define channels via negotiation of header compression technique, payload compression or encryption to be applied for each type of traffic. The SO may be defined for a generic packet data service or a specialized service optimized for a specific type of traffic, such as for VoIP traffic. The SO may use header compression for some or all packet flows, and may support different header compression techniques.

A problem arises when the MS 210 wants to handoff from the serving system (220-240) to the target system if the header compression technique and the SO currently used in the serving system (220-240) is not supported by the target system. In such a case, the compression contexts associated thereto must be reinitialized completely. This situation causes a certain delay for which the compression efficiency is far from optimal or totally null. In the example of VoIP flows over very narrow bandwidth wireless links, such delay impacts the perceived quality of speech until optimal compression efficiency is reached again.

As it can be appreciated, there is a need for fast change of Internet Protocol (IP) headers compression algorithm.

SUMMARY OF THE INVENTION

A first object of the present invention is directed to a method, in an Internet Protocol (IP) network, for fast change of IP Headers Compression (HC) mechanism. The IP network comprises a Mobile Station (MS) connected to a serving system. The MS uses a first IP HC mechanism with the serving system. The method comprises steps of initiating handoff of the MS from the serving system to a target system, choosing a second IP HC mechanism to be used with the target system, receiving a decompression context at the target system from the serving system and translating the decompression context from the first IP HC mechanism to the second IP HC mechanism.

A second object of the present invention is directed to a first decompressor node in the IP network. The first decompressor node is connected to a MS through an IP connection. The MS is further connected to a serving system. The serving system comprises a second decompressor node. The first decompressor node comprises a communication module capable of managing an Internet Protocol (IP) link toward the second decompressor node. It further comprises a decompression context initialization module capable of managing a plurality of decompression contexts and, after initiation of handoff of the MS from the serving system, receiving information from the second decompressor node. The decompression context initialization module is further capable of initializing one of the plurality of decompression contexts using the received information. In an optional embodiment of the present invention, the decompression context initialization module may be further capable of receiving a decompression context from the second decompressor node and translating the received decompression context into one of the plurality of the decompression contexts.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE PREFERRED EMBODIMENTS

As outlined above, it is desired to find a solution where no loss of header compression efficiency/performance is experienced when a Mobile Station (MS) needs to perform a handoff from a serving system to a target system in the event where the active header compression mechanism is not supported by the target system but for which a compatible compression mechanism exists. One inventive teaching of the present solution proposes that a specialized packet data service option be re-assigned to a generic packet data service option and vice-versa. The solution allows the header compressor and the header decompressor to implicitly or explicitly change between header compression mechanism without any need for context re-initialization or internal header compression signaling.

Figure 4:
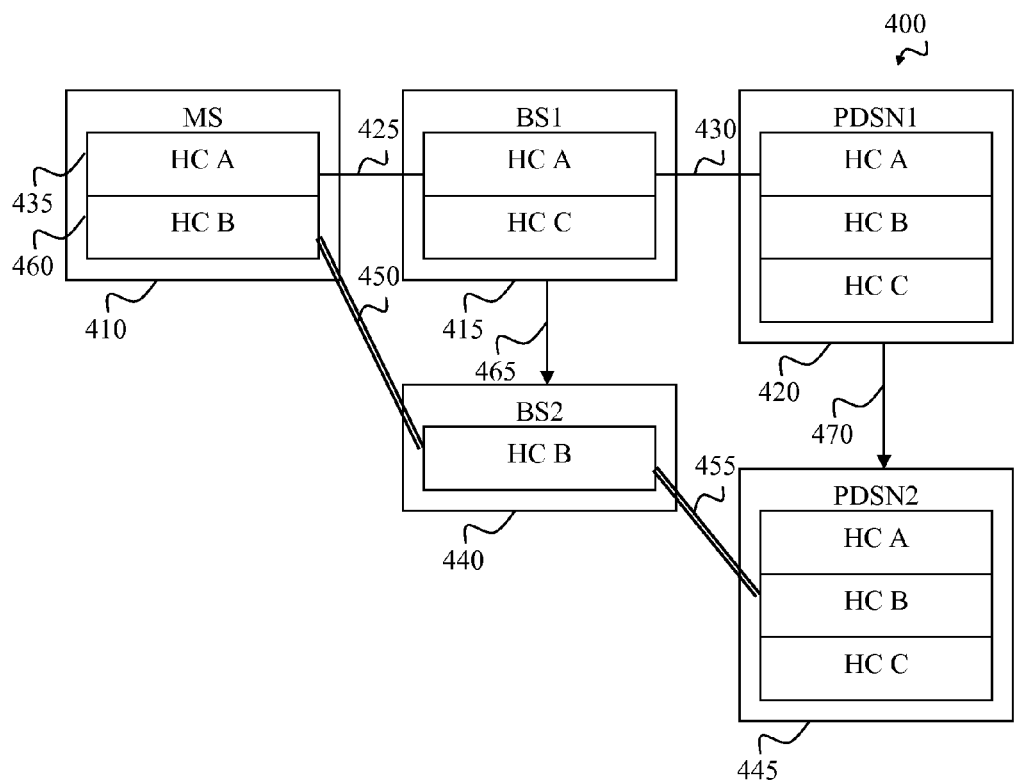
FIG. 4 is an exemplary Internet Protocol (IP) network enabling a fast change of IP headers compression mechanism during handoff from a serving system to a target system.

FIG. 4 shows an exemplary Internet Protocol (IP) network 400 enabling a fast change of IP headers compression mechanism during handoff from a serving system to a target system. A Mobile Station (410) is shown connected to a Base Station (BS) 415, the BS 415 being further connected to a Packet data Serving Node (PDSN) 420. A session established between the MS 410 and a further node (not shown) is shown transiting between the MS 410 and the BS 415 (on connection 425) and between the BS 415 and the PDSN 420 (on connection 430). The connections 425 and 430 make use of a first IP Headers Compression mechanism HC A 435. The HC A 435 necessitates the use of decompression contexts (not shown) on the connections 425 and 430. The decompression contexts are used between the farthest ends of an IP Headers compressed link. FIG. 4 is a generic example and does not specifically show the IP Headers compressed link. However, from the IP network 400 topology, a person sufficiently skilled in the art of IP Headers compression can appreciate that the IP Headers compressed link is either located between the MS 410 and the BS 415 or the MS 410 and the PDSN 420.

At one point during the session, the MS 410 needs to handoff from the BS 415, which represent the serving system together with the PDSN 420. In the example of FIG. 4, the target system is represented by a BS 440 and a PDSN 445. The session must be rerouted to transit by the BS 440 and the PDSN 445. For that purpose, further connections 450 and 455 are respectively used. Since HC A 435 is not supported by the BS 440, the connections 450 and 455 must use a further IP Headers Compression mechanism. Depending on the type of the IP network 400, there may be an agreement between the MS 410 and the target system. In such a case, the further IP Headers Compression mechanism can be implicitly chosen therebetween. If no agreement exists between the MS 410 and the target system, the further IP Headers Compression mechanism must be explicitly chosen. FIG. 4 shows the example where the further IP Headers Compression mechanism is HC B 460. Assumption is made that HC A 435 and HC B 460 share enough similarities for the fast change of IP headers compression mechanism to be possible. In order to avoid complete re-initialization of the decompression contexts, information is exchanged between the serving system and the target system. In one embodiment of the invention, the serving system sends its decompression context to the target system. In FIG. 4, the BS 415 is shown sending 465 its decompression context to the BS 440 and the PDSN 420 is shown sending 470 its decompression context to the PDSN 445. As mentioned earlier, the specific nature of the IP network 400 and the HC A 435 may trigger both exchanges 465 and 470 or only one of them. The BS 440 and the PDSN 445 then take appropriate steps to translate the received decompression context from the HC A 435 to the HC B 460. If necessary, some information may be requested from the MS 410 for that purpose. The complete handoff of the session may then occur.

Figure 5:
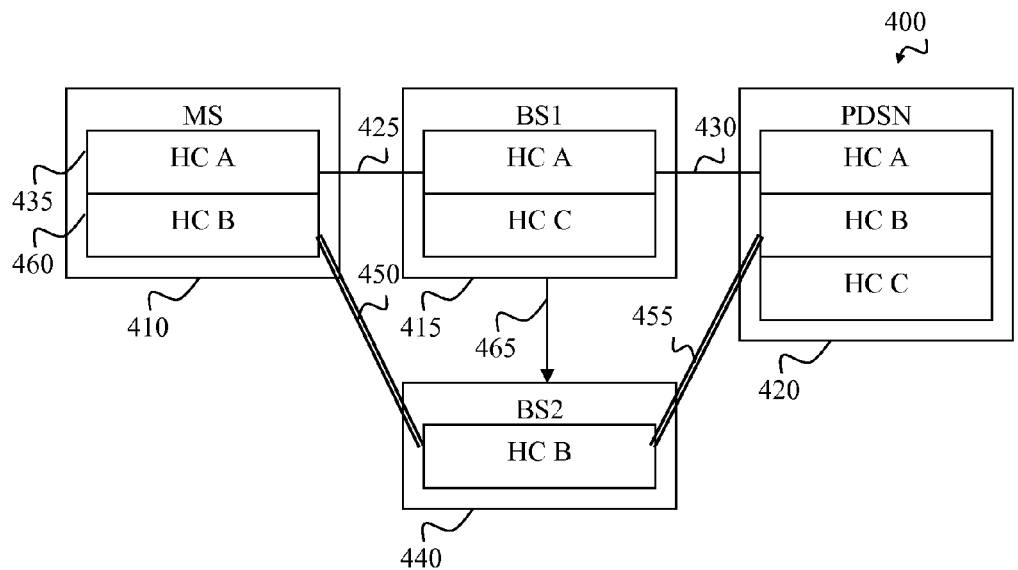
FIG. 5 is another exemplary Internet Protocol (IP) network enabling a fast change of IP headers compression mechanism during handoff from a serving system to a target system.

In some handoff cases, the PDSN 445 is not necessary since the BS 440 is connected to the PDSN 420. FIG. 5 shows this specific example. All steps and messages from FIG. 4 apply to FIG. 5, except that no information 470 is sent from the PDSN 420 since it also acts as the PDSN 445.

Figure 6:
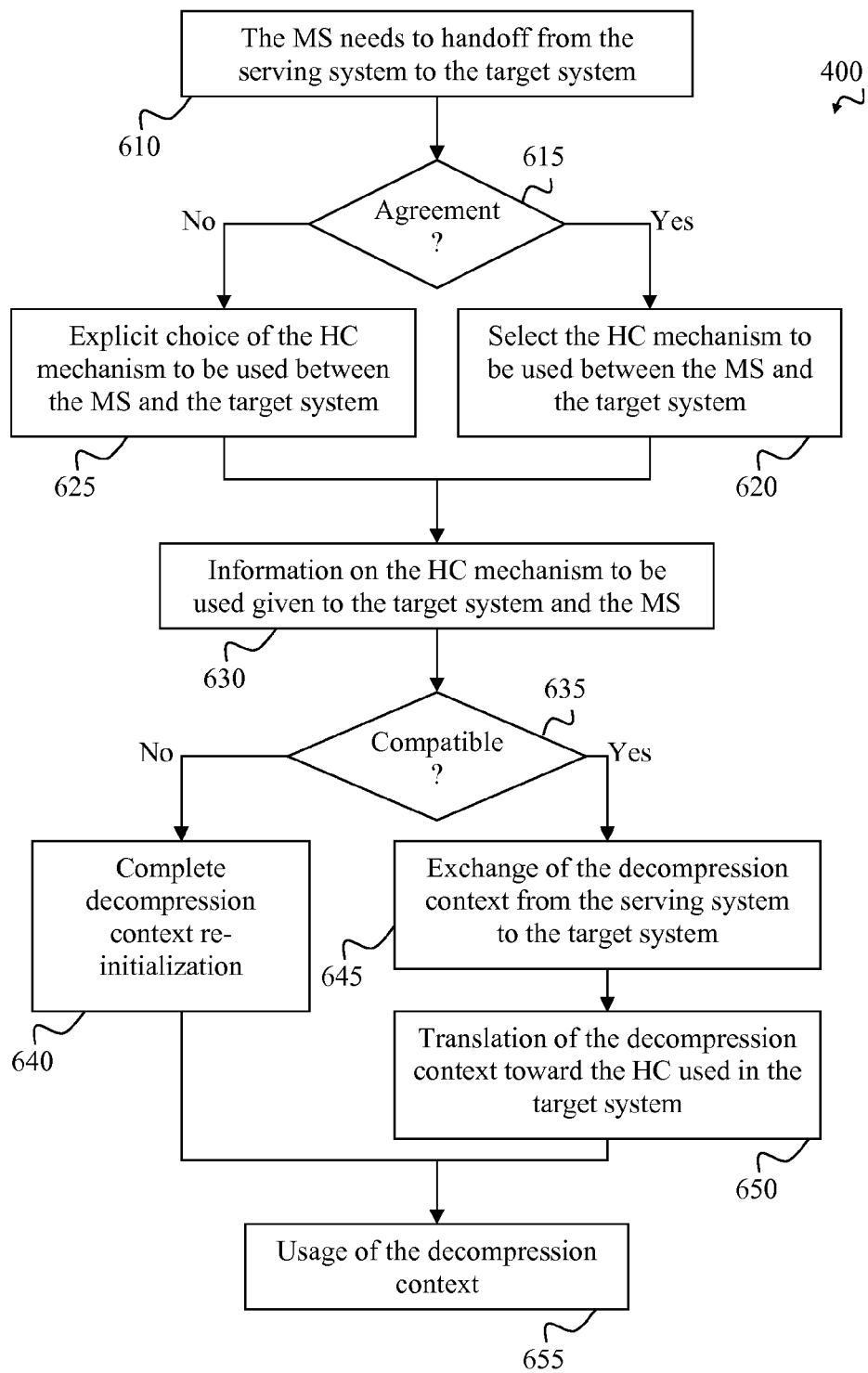
FIG. 6 is a flow chart of a fast change of Internet Protocol (IP) headers compression mechanism.

FIG. 6 shows a flow chart of a fast change of Internet Protocol (IP) headers compression mechanism in an IP network 400. Step 610 shows that the MS 410 needs to handoff from the serving system to the target system. Depending on the type of the IP network 400, the target system and the MS 410 then determine if an agreement exists between them 615 as to what IP Headers Compression mechanism should be used therebetween. If such an agreement is present, the IP Headers Compression mechanism (HC) is implicitly chosen 620. If no agreement exists, the MS 410 and the target system explicitly choose the HC to be used therebetween 625. In either step 620 or 625, the HC is chosen. If necessary, information on the HC to be used between the MS 410 and the target system is exchanged 630 within the target system or between the target system and the MS 410.

The target system and the MS 410 must then assess if the chosen HC is compatible with the previously used IP Header Compression mechanism. If not, a complete decompression context re-initialization is requested 640. If they are compatible, the serving system sends the decompression context to the target system (step 645). The target system then translates the decompression context to the chosen HC (step 650). Compatibility of HC is determined either implicitly (e.g. name or version of the HC) or explicitly by first exchanging information about the HC (step 630). In step 630, the exchanged information can be the decompression context of the previously used HC. Examples of compatible HC include different versions of a given HC, different HC compressing a single set of IP (e.g. IP/UDP/RTP), a second HC compressing a more limited set of IP (IP/UDP/RTP to IP/UDP), etc. An example of incompatible HC may be a second HC compressing a more complete set of IP (IP/UDP to IP/UDP/RTP) even though such transition may still be possible if other compatible characteristics are present. Either after the step 640 or the step 650, the decompression context may be used 655 and the handoff of the MS 410 toward the target system can occur.

Figure 7:
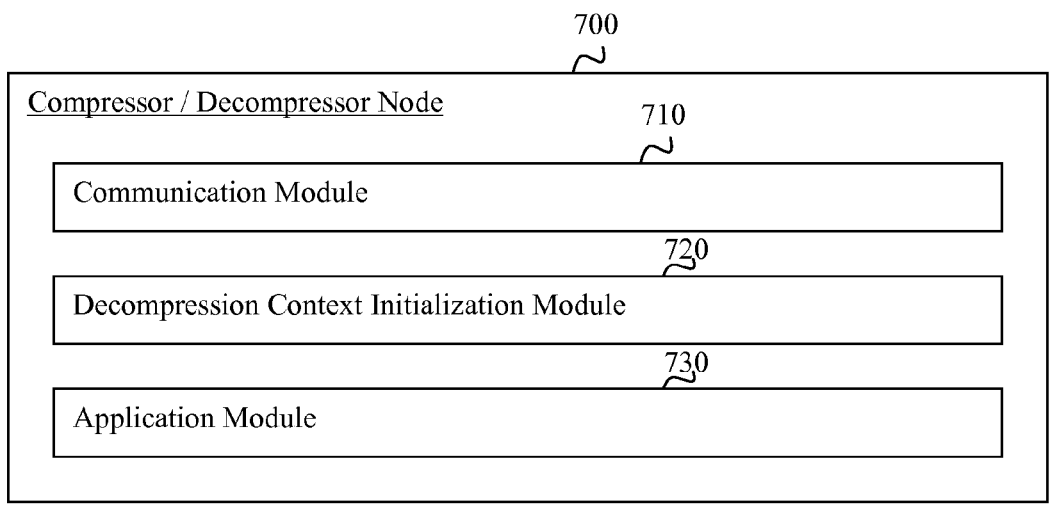
FIG. 7 is an exemplary modular representation of a compressor/decompressor node enabling a fast change of Internet Protocol (IP) headers compression mechanism during handoff from a serving system to a target system.

FIG. 7 shows an exemplary modular representation of a compressor/decompressor node 700 enabling a fast change of IP headers compression mechanism during handoff from a serving system to a target system. The compressor/decompressor node is connected to a Mobile Station (MS) (not shown) through an Internet Protocol (IP) connection (not shown). The MS is currently connected to a serving system (not shown) comprising a second compressor/decompressor node (not shown). The compressor/decompressor node comprises a Communication Module 710, a Decompression Context Initialization Module 720 and an Application Module 730. The Communication Module 710 of the compressor/decompressor node 700 is capable of managing the connections 425, 430, 450 and 455 discussed earlier. It is further capable of managing a wide range of network protocols such as, for example, the IP protocols. The Communication Module 710 is yet further capable of participating in establishment of a session between at least two nodes of the IP network. The Decompression Context Initialization Module 720 is capable of managing a plurality of decompression contexts. The decompression contexts may be partly or totally located within the compressor/decompressor node 700 or within the second compressor/decompressor node. In such a case, the Decompression Context Initialization Module 720 would use the Communication Module 710 to communicate therewith. The Decompression Context Initialization Module 720 is further capable of receiving information from the second compressor/decompressor node and initializing one of the plurality of the decompression contexts using the received information. For instance, the received information can be a decompression context used in the second compressor/decompressor node for a first IP Headers Compression mechanism and the initialization of the decompression context can consist of a translation of the received decompression context toward a second IP Headers Compression mechanism. The Application Module 730 is capable of managing various applications, which make use of a given Internet Protocol (IP) header compression mechanism. Examples of such applications include, but are not limited to, VoIP and VoIPoW.

A specific example from ROHC is further described in the following lines.

In a first step, a mobile device and an IP network initiate a handoff, and an active packet data service option is remapped to a new packet data service option. This may include an explicit signaling of which header compression scheme to use, but the header compression scheme may also be selected implicitly based on prior agreements between the mobile device and the IP network side according to the type of services being remapped.

Secondly, the header compressor and decompressor on each side are signaled, either externally or internally to the header compression scheme, which header compression scheme to use and if there is a need to perform explicit context re-initialization in case no compatible scheme is available.

Finally, for the case where a compatible header compression scheme is available at both sides, the existing contexts of both the compressor and the decompressor are reused and translated if needed locally for the selected header compression scheme, using the proper data structures and compression functions, without explicit context re-initialization.

Specifically for ROHC profiles compressing IP/UDP/RTP protocols (profiles 0x000 and 0x0005, [ROHC]) used for VoIP flows, a change of profile would normally require the compressor to transit to a lower compression state for Initialization and Refresh (IR state) and transmit an IR packet to re-initialize at least the dynamic part of the context and possibly the static part as well. The static part includes information such as Context Identifier (CID), compression profile, the IP source and destination addresses, the UDP source and destination ports, Synchronization source (SSRC) etc. The dynamic part includes information such as RTP sequence number (RTP SN), payload type, timestamps, timestamp stride etc.

When operating using the ROHC RTP profile (0x0001), during normal operation the information exchanged between compressor and decompressor may consist only of encoded bits for the RTP SN and a CRC (Cyclic Redundancy Check/Cyclical Redundancy Character). When operating using the ROHC LLA profile (0x0005), during normal operation no information is exchanged between compressor and decompressor, as the RTP SN and CRC are replaced by functionality provided by the lower layers.

With ROHC, a change of profile may only be performed using the IR or IR-DYN packet. Arbitrary transitions between profile 0x0001 and profile 0x0005 would normally involve the compressor going to IR state and send IR-DYN packets containing the updated profile identifier to enable the transition from one profile to another. For such transitions, the IR-DYN packet would minimally require one octet for each of the following fields: the packet type—IR-DYN, the profile and the CRC. Additionally, the dynamic chain containing information for the dynamic fields of the IP/UDP/RTP headers must be present. This represents a significant number of additional octets, in the order of tens.

By noting that profile 0x0005 is a simple extension to profile 0x0001, and although by the ROHC framework a compressor would be required to enable this transition using the IR-DYN packet, in theory a transition between those two profiles only requires that the profile identifier of the static context be updated and a coherent CID (Content Identifier) assignment for the logical channels used for the compressed IP/UDP/RTP flow. Fortunately, this may be coupled to the change of logical channel or packet data service itself. Alternatively, flows susceptible to use a transition between profile 0x0001 and 0x0005 should always use small CIDs and use CID=0 (already mandated by profile 0x0005). Using this approach, no bits need to be exchanged between compressor and decompressor for identifying the context associated to the flow for which the profile identification is to be updated, and no bits are needed for updating the profile identifier itself.

The net result of this procedure is that if transitions between ROHC profile 0x0001 and profile 0x0005 occurs, the compressor does not need to send any additional bits over the link and remain in the most efficient mode of compression (Second Order for a ROHC compressor).

More generally, the invention presented in this document removes the need to reinitialize the header decompressor and maintain optimal compression efficiency during certain handoff procedures. This directly results in bandwidth savings, as the data required to reinitialize the decompressor is no longer transmitted over the air interface. This is particularly applicable, but not limited to, the ROHC RTP profile and the LLA profile for VoIP is systems implementing generic packet data services and specialized packet data services for VoIP.

The innovative teachings of the present invention have been described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. A method in an Internet Protocol (IP) network for fast change of IP Headers Compression (HC) mechanism, the IP network comprising a Mobile Station (MS) connected to a serving system, the MS using a first IP HC mechanism with the serving system, the method comprising steps of:
    initiating handoff of the MS from the serving system to a target system;
    choosing a second IP HC mechanism to be used with the target system;
    receiving a decompression context at the target system from the serving system; and
    translating the decompression context from the first IP HC mechanism to the second IP HC mechanism.

2. The method of claim 1, wherein the step of initiating handoff is performed by one of the MS and the serving system.

3. The method of claim 1, wherein the step of choosing a second IP HC mechanism to be used with the target system further comprises verifying if an agreement on what IP HC mechanism should be used between the MS and the target system.

4. The method of claim 1 further comprising a step of verifying if the second IP HC mechanism is compatible with the first IP HC mechanism prior to the step of translating the decompression context from the first IP HC mechanism to the second IP HC mechanism.

5. The method of claim 1, wherein the step of receiving information at the target system is performed by at least one of a Base Station (BS) and a Packet Data Serving Node (PDSN).

6. A decompressor node in an Internet Protocol (IP) network, the decompressor node comprising:
    a communication module capable of:
        managing an Internet Protocol (IP) link toward a second decompressor node in the IP network; and
    a decompression context initialization module capable of:
        managing a plurality of decompression contexts;
        after initiation of a handoff of a Mobile Station a serving system, receiving a decompression context from the second decompressor node, decompression context being compatible with a first IP Header Compression (IP HC) mechanism; and
        initializing one of the plurality of the decompression contexts using the received information by translating the received decompression context into one of the plurality of the decompression contexts compatible with a second IP HC mechanism.

7. The decompressor node of claim 6 further comprising an application module capable of managing various IP applications.

* * * * *

UNITED STATES PATENT AND TRADEMARK OFFICE
CERTIFICATE OF CORRECTION

PATENT NO. : 7,359,372 B2  Page 1 of 1
APPLICATION NO. : 10/458326
DATED : April 15, 2008
INVENTOR(S) : Pelletier et al.

It is certified that error appears in the above-identified patent and that said Letters Patent is hereby corrected as shown below:

On the Title Page, in Field (73), under "Assignee", in Column 1, Line 1, delete "Telefonaktibolaget" and insert -- Telefonaktiebolaget --, therefor.

Figure 1:
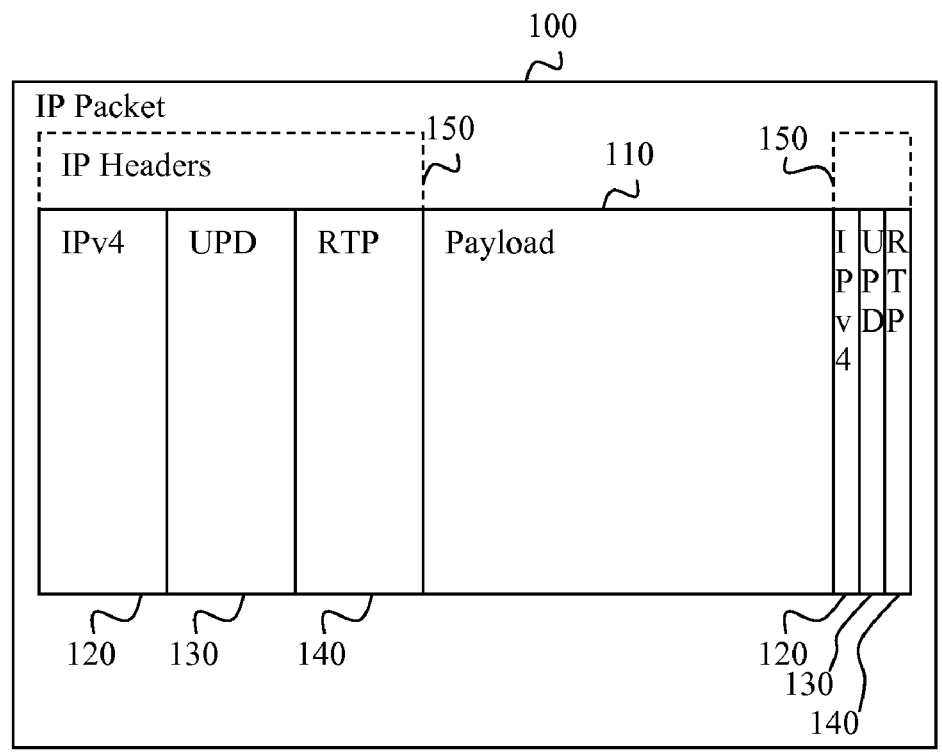
FIG. 1 shows an exemplary Internet Protocol (IP) packet.
Figure 2:
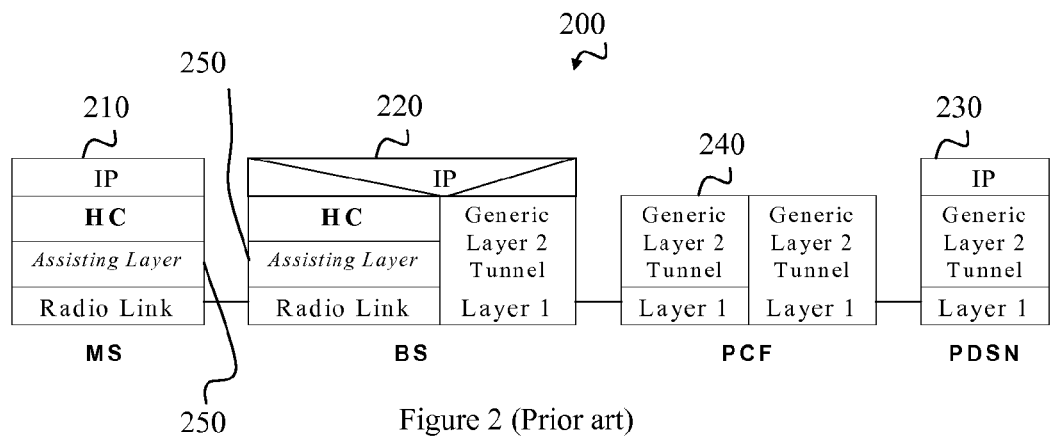
FIG. 2 is a prior art generic architecture of a header compression technique between a Mobile Station and a Base Station.
Figure 3:
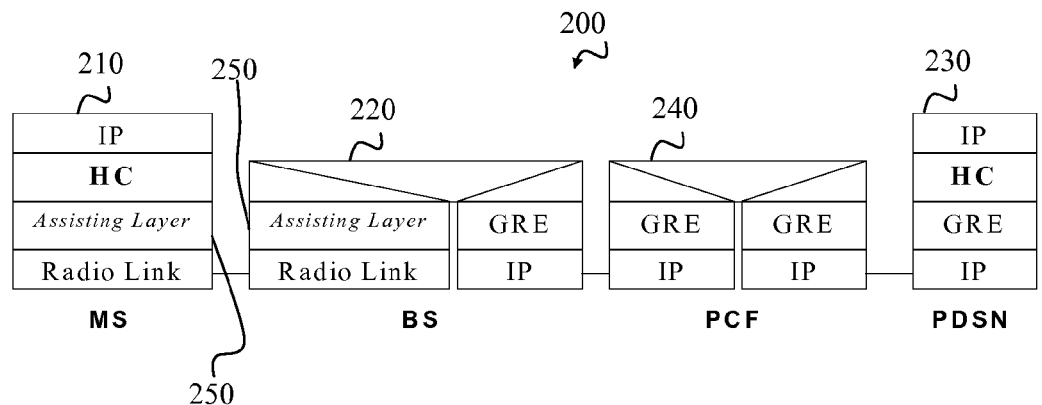
FIG. 3 is a prior art exemplary architecture of a header compression technique between a Mobile Station and Packet Data Serving Node.

In Fig. 2, Sheet 2 of 5, delete "[figure]" and insert --[figure]--, therefor.

In Column 10, Line 12, in Claim 6, after "Mobile Station" insert -- from --.

Signed and Sealed this

Seventeenth Day of February, 2009

JOHN DOLL
*Acting Director of the United States Patent and Trademark Office*